United States Patent Office 2,764,492
Patented Sept. 25, 1956

2,764,492

BORATE OPTICAL GLASS

Gustav Weissenberg and Otto Ungemach, Marburg (Lahn), Germany, assignors to Ernst Leitz G. m. b. H., Wetzlar (Lahn), Germany, a corporation of Germany No Drawing. Application June 12, 1951,
Serial No. 231,261

Claims priority, application Germany July 8, 1950

6 Claims. (Cl. 106—47)

Our invention relates to fundamental or parent substances for the melts of optical glass and the optical glasses obtained therefrom.

An entire series of optical glasses is known in which boric acid forms the essential glass forming constituent. These glasses have known special and valuable properties. Thus, for example, flint glasses have been developed on the base of boric acid-lead oxide, which possess an index of refraction of 2 and even somewhat higher. These glasses suffer from the defect that they are not stable against the atmosphere and also against crystallizing.

According to our invention very resistant fundamental materials of boric acid base may be obtained with great solvent capabilities for various oxides of metals, of the alkaline earth metals and of the rare earth metals, so that it is possible to bring each of these substances into solution in the melt of the parent substance in such amounts as may be necessary to attain especially valuable optical properties. The invention consists in this that from ½ mol to 10 mols of boric acid anhydride, $B_2O_3$, is melted down with one mol of lithium fluoride or at least one fluoride of group II of the periodic system, with the exception of radium, or with lithium fluoride together with at least one fluoride of group II. The fluorides of group II, excepting radium are, therefore, the fluorides of beryllium, magnesium, calcium, zinc, strontium, cadmium, barium, mercury. The elements of this group together with the low molecular weight lithium, group I, form a class which give the particular qualities to the glass of our invention. According to the invention lithium borate may be added to the mixture in place of a part of the lithium fluoride.

The melting temperature of, for example, a $$CaF_2\text{---}B_2O_3$$

fundamental or parent body lies essentially higher than that of the corresponding $LiF\text{---}B_2O_3$ glasses. The $CaF_2\text{---}B_2O_3$ glasses also have a higher transformation point and withstand long continued heating at substantially higher temperature than the $LiF\text{---}B_2O_3$ glasses.

The glasses of the invention serve as fundamental bodies to which, in the fused state, are added a single or several oxides, which themselves need not be glass forming, but which are soluble in boric acid. An example is aluminum oxide, $Al_2O_3$. There can also be added, in quantity insufficient to affect the characteristic properties of the glass, beryllium fluoride, silicic oxide, arsenious oxide, tellurium oxide ($TeO_3$), and antimony oxide which are themselves glass forming, which however are desired in the melt because a slight addition acts highly functional for stabilizing, decolorizing or for the attainment of any desired special optical properties.

In melting down a glass which, for example, consists of one mol of lithium fluoride and one mol of boric acid, only a certain part of the fluorine present may be found to be removed through the formation of boron trifluoride in melting.

The application of lithium fluoride with boric acid according to our invention has the advantage of giving especially stable fundamental substances with the optical stock obtainable with boric acid. Moreover the lithium fluoride acts as a flux so that the melt is more fluid.

With the addition of the fluoride to the boric acid, the dissolving capability of the boric acid melt for oxides is retained. For example it is possible for a fundamental glass melted with a molecular proportion of one mol of lithium fluoride to two mols of boric acid to contain up to 87% by weight of lead oxide.

The fundamental glass of the invention provides optical glass directly with good optical properties. Examples of mixtures which have given good results are:

I. A medium crown glass with a very small dispersion may be melted from a mixture of at least 40 percent by weight of calcium fluoride ($CaF_2$) and at least 40 percent by weight of boric acid anhydride ($B_2O_3$). Some results are shown in the following table:

| Melt No. | $CaF_2$, percent by weight | $B_2O_3$, percent by weight | $n_D$ | V |
|---|---|---|---|---|
| E 165 | 48 | 52 | 1.583 | 66 |
| E 177 | 45.5 | 54.5 | 1.593 | 66 |
| E 175 | 42.6 | 57.5 | 1.594 | 65 |

II. Also a medium crown glass with much smaller dispersion is obtained when at least 5% by weight of barium oxide (BaO) is dissolved in a parent substance consisting of calcium fluoride ($CaF_2$) and boric acid anhydride ($B_2O_3$).

| Melt No. | $CaF_2$ (in percent by weight) | $B_2O_3$ (in percent by weight) | BaO (in percent by weight) | $n_D$ | V |
|---|---|---|---|---|---|
| E 180 | 47.8 | 43.0 | 9.1 | 1.5906 | 66.4 |
| E 190 | 34.0 | 46.0 | 20.0 | 1.593 | 64.4 |
| E 191 | 28.5 | 38.4 | 33.1 | 1.597 | 63.6 |
| E 186 | 33.5 | 33.3 | 33.3 | 1.589 | 64.5 |
| E 218 | 23.8 | 42.8 | 33.4 | 1.608 | 66.5 |
| E 193 | 21.3 | 28.7 | 50.0 | 1.598 | 63.7 |

III. From the fundamental glass made in accordance with our invention crown glass with higher index of refraction and somewhat lower dispersion may be obtained by dissolving at least 40% by weight of lanthanum oxide ($La_2O_3$) and, at the most, 65% by weight of lanthanum oxide plus other oxides which are suited to obtaining selected optical properties.

| Melt No. | Compositions | | | | | | | Corresponding Properties | |
|---|---|---|---|---|---|---|---|---|---|
| | HgF (in percent by weight) | LiF (in percent by weight) | $B_2O_3$ (in percent by weight) | $La_2O_3$ (in percent by weight) | BeO (in percent by weight) | $TeO_3$ (in percent by weight) | $Al_2O_3$ (in percent by weight) | $n_D$ | V |
| S 385 | | 12.2 | 38.0 | 45 | | 4.8 | | 1.6801 | 55 |
| S 357 | | 9.1 | 40.9 | 50 | | | | 1.672 | 58 |
| S 232 | | 4.6 | 39.8 | 55.3 | 0.3 | | | 1.704 | 58 |
| S 557 | 27.0 | | 34.5 | 30.7 | | 0.45 | 7.35 | 1.6840 | 59.0 |

Melt S 557 shows that a high value crown glass can be melted on the basis of mercurous fluoride and boric acid.

IV. Glasses heretofore known of high index of refraction and a low dispersion, attaining an index of refraction of 1.7 with an Abbé number of V.=55 are formed of silicic acid and lanthanum oxide, and recently of silicic acid and thorium oxide. In the melts given in the following tables one comes materially above these values.

| Melt No. | Compositions | | | | | | Corresponding Properties | |
|---|---|---|---|---|---|---|---|---|
| | $CaF_2$ (in percent by weight) | $B_2O_3$ (in percent by weight) | $La_2O_3$ (in percent by weight) | $In_2O_3$ (in percent by weight) | $ZrO_2$ (in percent by weight) | $TeO_2$ (in percent by weight) | $n_D$ | V |
| S 439 | 9.1 | 35.1 | 55.3 | | | 0.5 | 1.718 | 56 |
| S 465 | 8.9 | 34.1 | 54 | 2.5 | | 0.5 | 1.726 | 56.4 |
| S 466 | 8.9 | 34.1 | 54 | | 2.5 | 0.5 | 1.731 | 53 |
| S 490 | 8.4 | 32.7 | 51.5 | | 7.5 | 0.4 | 1.737 | 52 |
| Y 168/S 505 | 8.0 | 31.9 | 50.3 | | 10 | 0.4 | 1.7505 | 50.3 |

Also besides the substances enumerated in this table there can be applied the usual substances in the usual amounts for stabilizing such as aluminum oxide ($Al_2O_3$), magnesium oxide (MgO), silicon dioxide ($SiO_2$) and germanium oxide ($GeO_2$) etc., and decolorising agents such as arsenic trioxide ($As_2O_3$) etc.

V. Objects of the following melts are flint glasses stable against the atmosphere and against crystallization which are obtained when one uses the high solvent capabilities of glasses according to the invention and such glass dissolves at least 40% by weight of lead oxide (PbO). The higher the lead content, the more must the additions which hinder crystallization, for example, aluminum oxide ($Al_2O_3$) or silicon dioxide ($SiO_2$) or both together be increased. It is suitable for this purpose with a lead oxide above 80% by weight of the melt to increase the content of these substances up to 8% by weight.

| Melt No. | Compositions | | | | | | | | | Corresponding Properties | |
|---|---|---|---|---|---|---|---|---|---|---|---|
| | LiF | $ZnF_2$ | $B_2O_3$ | PbO | $Al_2O_3$ | $As_2O_3$ | $SiO_2$ | $La_2O_3$ | $GeO_2$ | $n_D$ | V |
| G 404 | 2.6 | | 28.4 | 62.1 | 2.3 | 2.3 | 2.3 | | | 1.7658 | 31.4 |
| G 377 | 2.0 | | 21.3 | 70.0 | 4.6 | 2.1 | | | | 1.8349 | 26.2 |
| G 326 | 1.2 | | 14.0 | 78.0 | 2.3 | | | | 4.5 | 1.9456 | 22.0 |
| G 290 | 1.4 | | 14.5 | 79.5 | 2.3 | 2.3 | | | | 1.9400 | 20.1 |
| G 319 | 1.4 | | 14.5 | 79.5 | 2.3 | | | 2.3 | | 1.9740 | 19.7 |
| G 321 | | 3.75 | 12.5 | 81.3 | | 2.45 | | | | 2.0095 | 18.7 |
| G 154 | 0.9 | | 9.95 | 81.75 | 7.4 | | | | | 1.9520 | 18.7 |
| G 349 | 1.25 | | 10.1 | 82.4 | 7.0 | | | | | 1.9430 | 18.2 |
| G 441 | 0.75 | | 7.57 | 82.6 | 4.54 | 2.27 | 2.27 | | | 2.0002 | 17.7 |
| G 312 | 0.7 | | 7.8 | 84.5 | 2.3 | 4.7 | | | | 2.0523 | 16.7 |
| G 313 | 0.7 | | 7.9 | 86.0 | | 5.4 | | | | 2.0989 | 15.8 |

Arsenic trioxide has proved successful for decolorizing the glasses of high lead oxide content.

The optical glasses of the invention are, naturally, not limited to the above mentioned examples. It is possible, without anything further, to add other oxides of the rare earths, of the alkaline earths, or of the metals which may be necessary to obtain predetermined optical values. Equally, substances can be added which find application for stabilizing the glasses and/or as decolorizing agents, as, for example, silicic oxide, germanium oxide, antimony oxide, etc.

Having described our invention, what we claim is:

1. Optical glass consisting essentially of boric acid anhydride, at least one fluoride of an element of the group consisting of lithium, magnesium, calcium, strontium, barium, zinc, cadmium and mercury and at least one oxide of an element of the group consisting of lithium, magnesium, calcium, strontium, zinc, barium, cadmium and mercury, in which the mol proportion of boric acid anhydride to the fluorides lies between 10:1 and 1:1 and the boric acid anhydride and fluorides together are between 8.3 by weight and 91% by weight of the glass the balance being oxides of the above group.

2. Optical glass consisting essentially of boric acid anhydride, at least one fluoride of an element of the group consisting of lithium, magnesium, calcium, strontium, barium, zinc, cadmium and mercury, lanthanum oxide and zirconium oxide, in which the mol proportion of boric acid anhydride to the fluorides lies between 10:1 and 1:1, the lanthanum oxide is between 50.3% by weight and 54.0% by weight and the zirconium oxide is between 2.5% by weight and 10% by weight.

3. Optical glass consisting essentially of boric acid anhydride, at least one fluoride of an element of the group consisting of lithium, magnesium, calcium, strontium, barium, zinc, cadmium and mercury, lanthanum oxide and indium oxide in which the mol proportion of boric acid anhydride to the fluorides lies between 10:1 and 1:1 and the quantity of lanthanum oxide is between 50.3% by weight and 54.0% by weight and the quantity of indium oxide is 2.5% by weight.

4. Optical glass consisting essentially of boric acid anhydride, at least one fluoride of the elements of the group consisting of lithium, magnesium, cadmium, strontium, barium, zinc, calcium and mercury, and lead oxide, in which the mol proportion of boric acid anhydride to the fluorides lies between 10:1 and 1:1 and the quantity of lead oxide amounts to from 61.2% by weight to 86% by weight.

5. Optical glass consisting of the fundamental substance of claim 1 and stabilized with aluminum oxide.

6. Optical glass consisting of the fundamental substance of claim 1 and decolorized with arsenic trioxide.

References Cited in the file of this patent

UNITED STATES PATENTS

| 1,529,259 | Locke et al. | Mar. 10, 1925 |
| 2,420,644 | Athy et al. | May 20, 1947 |
| 2,578,325 | Sun et al. | Dec. 11, 1951 |

FOREIGN PATENTS

| 8,704 | Great Britain | 1907 |
| 462,304 | Great Britain | 1937 |
| 694,213 | Germany | 1940 |